United States Patent [19]
Morin et al.

[11] Patent Number: 5,996,512
[45] Date of Patent: Dec. 7, 1999

[54] SYSTEM FOR RECYCLING REFUSE

[75] Inventors: Jean-Xavier Morin, Neuville Aux Bois; Jean-Pierre Peyrelongue, Pontchartrain, both of France

[73] Assignee: GEC Alsthom Stein Industrie, Velizy-Villacoublay, France

[21] Appl. No.: 09/015,530

[22] Filed: Jan. 29, 1998

[30] Foreign Application Priority Data

Jan. 30, 1997 [FR] France ................... 97 00994

[51] Int. Cl.$^6$ .............................. F23G 5/02; F23G 5/30
[52] U.S. Cl. .................... 110/234; 110/215; 110/219; 110/220; 110/222; 110/224; 110/229; 110/245
[58] Field of Search .................... 110/203, 215, 110/216, 218, 219, 220, 222, 224, 229, 233, 234, 243, 244, 245, 346

[56] References Cited

U.S. PATENT DOCUMENTS

| | | | |
|---|---|---|---|
| 4,155,313 | 5/1979 | Moss | 110/220 X |
| 4,253,405 | 3/1981 | Cottrell et al. | 110/222 |
| 4,421,038 | 12/1983 | Goldbach et al. | 110/220 X |
| 4,977,837 | 12/1990 | Roos et al. . | |
| 5,316,736 | 5/1994 | Vidal et al. | 110/245 X |
| 5,345,884 | 9/1994 | Vandycke et al. | 110/245 X |
| 5,425,317 | 6/1995 | Schaub et al. | 110/216 X |

FOREIGN PATENT DOCUMENTS

| | | |
|---|---|---|
| 2716524A1 | 8/1995 | France . |
| 2735041A1 | 12/1996 | France . |
| WO9620130 | 7/1996 | WIPO . |

OTHER PUBLICATIONS

H. Drescher, "Glasvermahlung Neue Wege Beimaltglasrecycling" Sprechsaal, vol. 128, No. 2, Mar. 1, 1995, pp. 10–15.

J. Scheffler et al, "Erzeugung Verwertbarer Produkte Durch Aufbereitung Und Verglasung Voin Rostaschen Aus Der Mullverbrennung", Entsorgungs Praxis, vol. 13, No. 12, Dec. 1, 1995, pp. 26–30.

Primary Examiner—Ira S. Lazarus
Assistant Examiner—Ljiljana V. Ciric
Attorney, Agent, or Firm—Sughrue, Mion, Zinn, Macpeak & Seas, PLLC

[57] ABSTRACT

An apparatus for recycling municipal waste as energy includes a shredder for shredding the waste, and removing rejects, the rejects from the shredder being sorted into a first stream of inert matter that is substantially unpolluted with organic matter and into a second stream of inert matter that is substantially polluted with either organic matter or with combustible heavy elements; a first outlet for removing the second stream of inert matter; a circulating fluidized bed reactor for receiving the shredded waste and producing gases with solid particles therein; a cyclone for separating out the solid particles and receiving the gases output by the reactor; a recuperator boiler into which the gases output by the cyclone are discharged and which is provided with a first set of heat exchangers, the boiler including a dust-filtering hopper; a second outlet for removing the solid particles from the dust-filtering hopper; a second set of heat exchangers disposed in a chamber into which the gases are fed after transition the boiler; a final treatment apparatus for treating the gases and producing solid matter, after the gases transit the chamber; a third outlet for removing the solid matter resulting from the final treatment apparatus; and an independent melting and vitrification furnace which is connected to each of the first, second, and third outlets by a respective controlled pipe.

10 Claims, 2 Drawing Sheets

SYSTEM FOR RECYCLING REFUSE

The present invention relates to an installation for recycling municipal waste and the like as energy.

BACKGROUND OF THE INVENTION

Such recycling municipal waste installation is described in Patent Document FR- 2 735 041.

It is also known that fly ash from municipal waste treatment installations can be vitrified so as to fuse the inorganic matter and burn the carbon-containing matter.

It is known that such a melting and vitrification furnace can be installed on the main line of the installation. Such vitrification is disclosed in Patent Document DE-43 33 510.

In such installations, a post-combustion chamber for the gases coming from the pyrolysis or gasification system (rotary furnace or fluidized bed reactor) is provided downstream from the reactor, and, on being discharged, the molten ash is vitrified in a quenching bath.

Such vitrification systems require a considerable external supply of natural gas, of oxygen, or of electricity because of the large quantity of solid materials treated by vitrification. The calorific value of the solid matter discharged by the reactor is not high enough to generate the temperature required to melt a large mass of inert matter.

As a result, the net energy production efficiency of such an installation is reduced considerably, and investment and operating costs are very high.

SUMMARY OF THE INVENTION

The invention solves the efficiency problems of such an installation for recycling waste as energy, and to this end, according to the invention, the installation is provided with an independent melting and vitrification furnace that is connected to each of said outlets by a respective controlled pipe.

This configuration makes it possible to melt and to vitrify only what is necessary to improve the overall economics of solid residue management and to optimize it case-by-case as a function of the specific or local conditions of waste collection. It also makes it possible to achieve this while consuming as little heat energy as possible from the waste so as to retain high energy efficiency.

It is possible to use various types of melting and vitrification apparatuses specifically adapted to the quality of the waste to be treated. It is thus possible to consider treating ranges of substances including waste or fuels that have thermal characteristics remote from traditional household refuse or that are difficult to treat in a fluidized bed, e.g. for reasons of density or because of the risk of agglomeration at low temperatures.

This configuration also offers the advantage of avoiding making the installation unavailable if a problem is encountered with the melting and vitrification furnace. Since the furnace is no longer on the main line of the installation, operation of it can be interrupted without interrupting the main line.

In a preferred embodiment a dust-filtering apparatus is disposed between the recuperator boiler and the second set of heat exchangers, the solid particles from the dust-filtering apparatus being removed via an outlet connected to the melting and vitrification furnace by a controlled pipe.

Conventionally, the apparatus for filtering the fly ash is disposed downstream from the heat exchangers, and it thus, filters the dust from the gases at low temperature. Unfortunately, at low temperature, the dioxins re-form and the most polluting heavy metals re-condense. As a result the settled fly ash is polluted.

According to this characteristic of the invention, the dust-filter apparatus, preferably a cyclone, is disposed between the recuperator boiler and the second set of heat exchangers. As a result, the fly ash produced is extracted at high temperature and is thus little polluted with heavy metals and with dioxins.

Preferably, the final treatment apparatus includes a filter from which the solid particles are removed via an outlet connected to the melting and vitrification furnace by a controlled pipe.

In addition, the final treatment apparatus advantageously includes a flue-gas scrubber from which a scrubber cake is removed via an outlet connected to the melting and vitrification furnace by a controlled pipe.

In order to ensure that the size of the reject grains to be vitrified is correct, a sifting shredder is installed between the first outlet and the melting and vitrification furnace.

Advantageously, the reactor is equipped with an internal dense bed provided with a chamber for tapping off the pyrolitic gas which is injected into the melting and vitrification furnace.

Advantageously, the melting and vitrification furnace is provided with a quenching bath, and the scrubber apparatus is equipped with a liquid effluent treatment apparatus from which the rejects are injected into the quenching bath of the melting and vitrification furnace.

In a preferred embodiment, the melting and vitrification furnace is provided with a bowl-shaped hearth and a wall forming a refining barrier associated with an orifice via which the surface layer of the mass of molten matter is removed or skimmed off.

Preferably, the molten matter is cooled firstly on a drum cooled internally by water, and then in a quenching bath.

Advantageously, the melting and vitrification furnace is provided with a quenching bath in which the combustion gases produced by the furnace are cooled.

BRIEF DESCRIPTION OF THE DRAWINGS

The invention is described below in more detail with reference to figures which merely show a preferred embodiment of the invention, and in which.

DETAILED DESCRIPTION OF THE PREFERRED EMBODIMENTS

Figure 1:
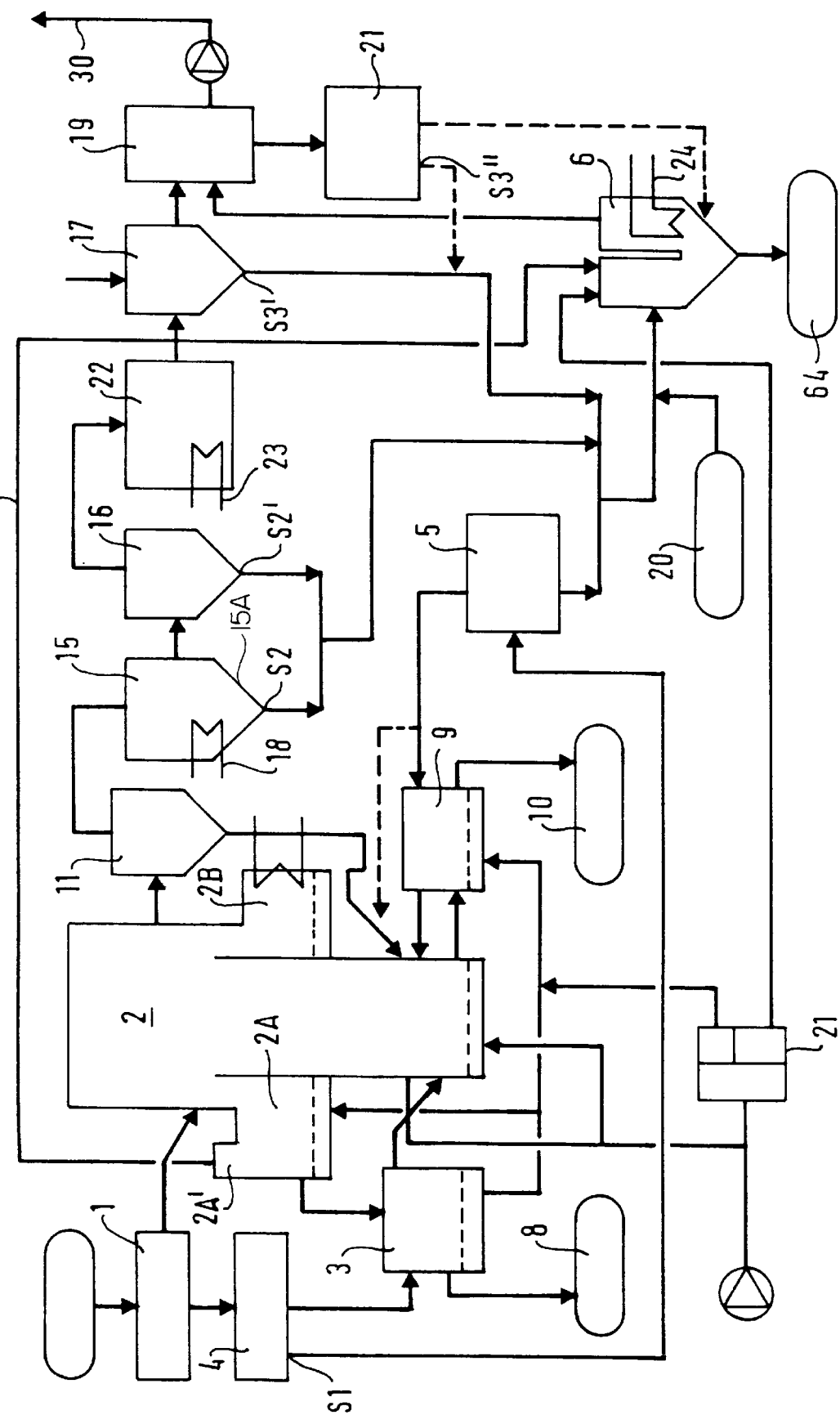
FIG. 1 is an overall view of an installation of the invention for recycling municipal waste.

As shown in FIG. 1, the installation for recycling municipal waste and the like as energy includes a circulating fluidized bed reactor 2 receiving the waste in the shredded state. Preferably, this reactor is of the type described in Patent Document FR- 2 735 041. It thus includes a first side dense fluidized bed 2A situated on that wall of the reactor which is provided with the feed pipe via which the shredded waste is fed in, and where the shredded waste undergoes gasification, and a second side dense fluidized bed 2B equipped with a superheater An extraction duct via which the non-fluidizable heavy elements are extracted is situated at the base of the first side dense fluidized bed 2A, and it conveys said heavy elements to coarse-particle sorter apparatus 3 that cools the elements and that extracts the non-fluidlzable inert matter, the remaining matter being fed back into the reactor 2.

Upstream from the reactor 2, the raw waste is inserted into preparation apparatus 1 by firstly shredding the waste, e.g. by means of a shearing module comprising one or two rotary shears, and secondly removing the inert matter and the matter that is likely to agglomerate (ferrous metals, non-ferrous metals, pebbles, glass) e.g. by means of magnetic and induction separators and/or of tumbler drums depending on the type of waste to be treated.

The shredded waste is inserted into the reactor 2 and the rejects are sorted into two streams in sorter apparatus 4 preferably constituted by gravity classifiers or air classifiers.

A first stream of inert matter that is little polluted with organic matter (glass, pebbles, solid scrap metal) is inserted into the coarse-particle sorter apparatus 3, where, mixed with hot matter coming from the reactor 2 and used to cool the non-fluidizable inert matter coming from the reactor 2, it is subjected to heat treatment or "heat cleaning" at a temperature approximately in the range 400° C. to 500° C. to remove the organic matter.

Under the coarse-particle sorter apparatus 3, a stream of solid residue 8 is thus obtained composed of matter which is inert and/or of large size (stones, glass, ceramic, scrap metal), which is only slightly oxidized and from which the organic and slightly oxidized matter has been removed, thereby facilitating recycling of said residue.

A second stream of inert matter polluted with organic matter or with combustible heavy elements, whose carbon content is greater than 5%, and therefore that cannot be recycled directly, is removed via a first outlet S1 from which it is inserted into a sifting shredder 5 installed on a controlled pipe leading to a melting and vitrification furnace 6.

The first internal dense bed 2A is provided with a chamber for tapping off the pyrolitic gas 2A' which is injected into the melting and vitrification furnace 6 via a pipe 7 separate from the main stream of combustion gases.

The reactor 2 is also provided with fine-partlcle sorter apparatus 9 enabling ash to be separated out at the bottom of the reactor 2 and enabling solid particles whose grain-size is compatible with fluidization to be re-circulated into the reactor. This apparatus 9 is also used to re-inject fine particles coming from the sifting shredder 5. These fine particles still contain an organic portion which can be used for combustion of the fluidizable inert matter, and their inert matter content reduces the consumption of sand serving as the main component in the reactor 2. Putting these fine rejects through the fine-particle sorter apparatus, also enables them to be heat cleaned of the non-fluidizable elements. The recyclable clinker 10 is removed from the fine-particle sorter apparatus 9.

The quality of the rejects is thus improved by them being put through coarse-particle sorter apparatus 3 and fine-particle sorter apparatus 9, the apparatus being associated with the reactor 2. It is thus not necessary to store them in Class 2 waste-storage sites.

Downstream from the reactor 2, the flue gases circulate through the following:
   a cyclone 11 for separating out the solids;
   a recuperator boiler 15 into which the gases output by the cyclone 11 are discharged, and which is equipped with a first set of heat exchangers 18, and more precisely with an evaporator, the boiler including a dust-filtering hopper 15A from which the solid particles are removed via a second outlet S2;
   a second cyclone 16 for hot-filtering the flue gases from which solid particles are removed via an outlet S2';
   a second set of heat exchangers 23, and more precisely an economizer, disposed in a chamber 22 into which the gases are fed; and
   a final treatment apparatus in which the solid matter resulting from the treatment is removed from the gases via a third outlet S3' and S3".

More precisely, the final treatment apparatus comprises a filter 17, preferably a sleeve filter, provided with an inlet via which activated carbon can be injected, and from which the solid particles are removed via an outlet S3', and a flue-gas scrubber module 19 from which a scrubber cake is removed via an outlet S3", the cleaned flue gases being removed via a flue 30.

The scrubber apparatus 19 is provided with an apparatus 21 for treating the liquid effluents.

All of the above-described outlets S1' to S3" are connected by controlled pipes to the melting and vitrification furnace 6 which is independent from the above-described main line of the installation.

In this apparatus 6, the melting energy is supplied by the pyrolitic gas taken from the fluidizing bed 2A, and optionally by feeding in plastics waste 20 that can come from packaging recycling, the rejects (soiled packaging) of which contain considerable heat-energy. The oxidant of the melting furnace 6 is air or air enriched with oxygen, depending on the desired temperature. When the air is enriched with oxygen, it is supplied by a diaphragm unit 21, and the fraction that has had its oxygen content reduced is then used for fluidizing the sorter apparatus 3 and 9 and the fluidized-bed reactor 2.

The grain size of the fly ash coming from the outlet S2 of the recuperator boiler 15, from the outlet S2' of the cyclone 16, and from the outlet S3" of the filter 17, and the grain size of the scrubber cake 19 coming from outlet S3" of the scrubber apparatus 19 enable this matter to be injected directly into the melting and vitrification furnace 6. However, the rejects from the sorter apparatus 4 for preparing the waste are of grain size that varies widely and that may be large. It is therefore necessary to provide the sifting shredder 5 between the outlet S1 and the melting and vitrification furnace 6.

The melting and vitrification furnace 6 may be designed differently depending on the quantities of matter to be treated, and on the degree of melting required.

It may be of the type described in Patent Document FR-2 716 524, in which case the two fractions to be vitrified can be melted in a controlled and separate manner, the two fractions being the coarse fraction coming from the rejects and whose heavy-metal concentration is generally low, and the fraction in powder form the coming from extractions of more heavily polluted fly ash.

Figure 2:
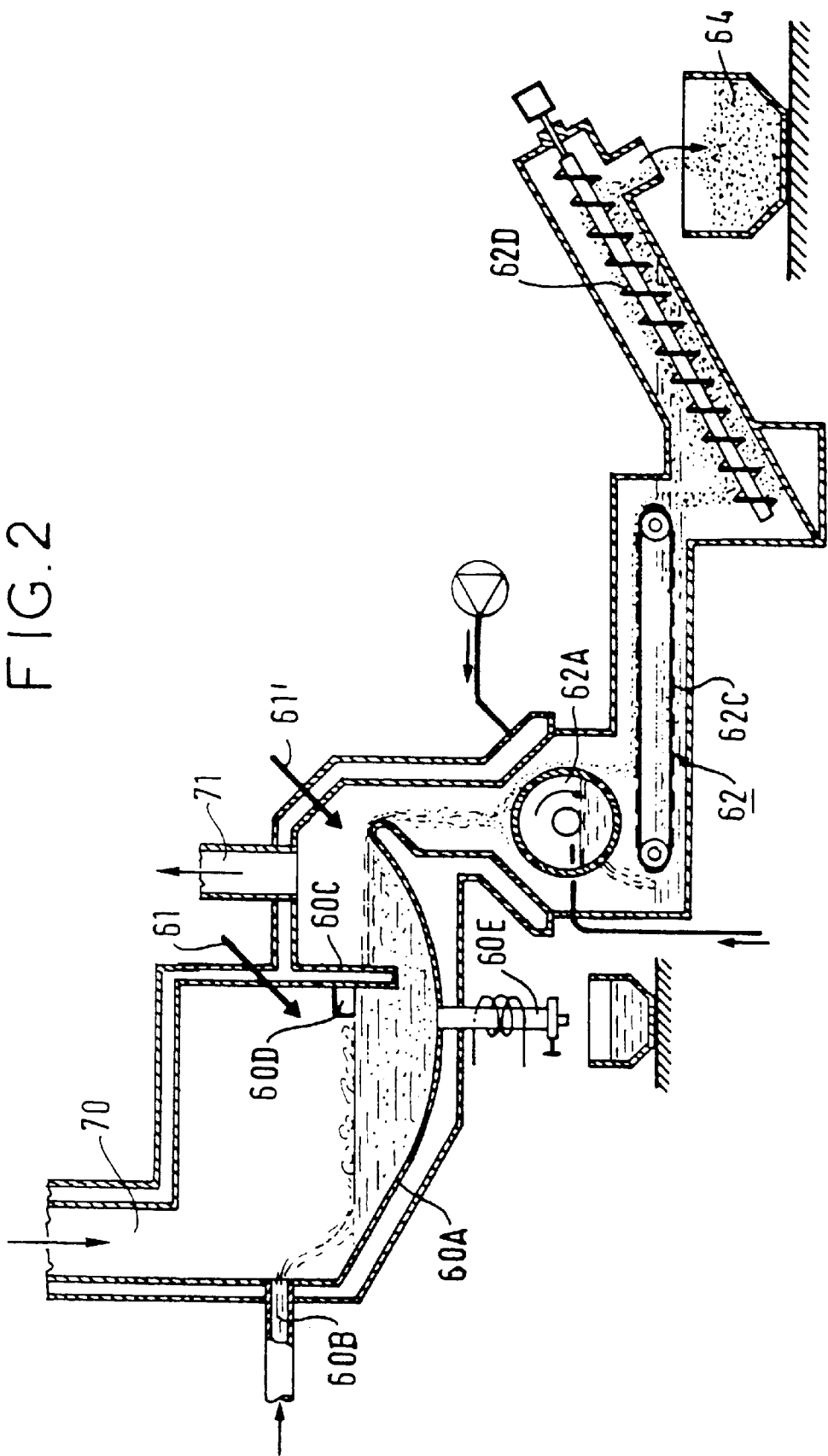
FIG. 2 is a section view of an embodiment of a melting and vitrification furnace.

FIG. 2 shows another embodiment of the melting and vitrification furnace.

The hearth 60A of the furnace is in the form of a bowl into which the fly ash and the like flows via the orifice 60B. The pyrolitic gas is fed in via the duct 70, and, because of its temperature, the ash melts. The furnace is also provided with a burner 61 fed with air or with enriched air. A wall 60C forms a refining barrier associated with an orifice 60D for removing or skimming off the surface layer of the mass of molten matter. The molten salts are thus removed. In addition, a drain 60E for draining off the metals that have fallen to the bottom of the hearth is provided to improve the quality of the melt.

Downstream from the barrier wall 60C, the apparatus optionally includes a back-up oxygen burner 61' and the melt flows from a pour lip onto a drum 62A which is water cooled internally. The drum 62A makes it possible to avoid sudden water quenching in the bath 62, and solidification that is too rapid and that is harmful to the mechanical characteristics of the vitrificate. Vitrification continues in the quenching bath 62 on a cooled-plate conveyer 62C before the vitrificate 64 is extracted by a conveyer screw 62D through a water seal for sealing in the flue gases.

This embodiment makes it possible to improve the quality of the vitrificate effectively by reaching a level of crystallization that guarantees very long term stability.

The gases produced in the melting furnace 6 are cooled by water quenching by being dipped into the vitrification bath. This sudden cooling prevents dioxins from re-forming, which dioxins are contained in particular in the mixture of fly ash and of activated carbon coming from the filter 17. It also traps the secondary fly ash that flies off above the melt, and the majority of the heavy metals that evaporate during melting, and this avoids having to return them to the main flue gas treatment apparatus.

The flue gases are then removed via the duct 71, and they are fed into the scrubber apparatus 19.

To compensate for the evaporation, the water in the quenching bath of the melting and vitrification furnace 6 is topped up using rejects from the liquid effluent treatment apparatus 21, which makes it possible to adjust the pH of the bath and to improve heavy-metal insolubility.

Advantageously, a cooling circuit 24 removes heat energy from the vitrification bath to use it to heat up the boiler feed water.

What is claimed is:

1. An apparatus for recycling municipal waste as energy, the recycling apparatus comprising:

a shredder for shredding the waste and removing rejects, the rejects from the shredder being sorted into a first stream of inert matter that is substantially non-polluted with organic matter, and into a second stream of inert matter that is substantially polluted with either one of organic matter and combustible heavy elements;

a first outlet for removing the second stream of inert matter;

a circulating fluidized bed reactor for receiving the shredded waste and producing gases with solid particles;

a cyclone for separating out the solid particles, and receiving the gases output by the reactor;

a recuperator boiler into which the gases output by the cyclone are discharged, and which is provided with a first set of heat exchangers, the boiler including a dust-filtering hopper;

a second outlet for removing the solid particles from the dust-filtering hopper;

a second set of heat exchangers disposed in a chamber into which the gases are fed after transiting the boiler;

a final treatment apparatus for treating the gases and producing solid matter, after the gases transit the chamber;

a third outlet for removing the solid matter resulting from the final treatment apparatus; and an independent melting and vitrification furnace which produces molten matter from which vitricate is processed, the furnace being connected to each of said first outlet said second outlet, and said third outlet by a respective controlled pipe.

2. The recycling apparatus according to claim 1, wherein the dust-filtering hopper is disposed between the recuperator boiler and the second set of heat exchangers, the solid particles from the dust-filtering hopper being removed via the second outlet which is connected to the melting and vitrification furnace by the respective controlled pipe.

3. The recycling apparatus according to claim 1, wherein the final treatment apparatus includes a filter from which the solid particles are removed via the third outlet which is connected to the melting and vitrification furnace by the respective controlled pipe.

4. The recycling apparatus according to claim 1, wherein the final treatment apparatus includes a flue-gas scrubber from which a scrubber cake is removed via the third outlet which is connected to the melting and vitrification furnace by the respective controlled pipe.

5. The recycling apparatus according to claim 1, wherein a sifting shredder is installed between the first outlet and the melting and vitrification furnace.

6. The recycling apparatus according to claim 1, wherein the reactor is equipped with an internal dense bed provided with a chamber for tapping off the gases which are injected from the reactor into the melting and vitrification furnace.

7. The recycling apparatus according to claim 3, wherein the melting and vitrification furnace is provided with a quenching bath, and the final treatment apparatus is provided with a scrubber module which is equipped with a liquid effluent treatment apparatus which produces fly ash, the fly ash from the scrubber module being injected into the quenching bath of the melting and vitrification furnace.

8. The recycling apparatus according to claim 1, wherein the melting and vitrification furnace is provided with a bowl-shaped hearth and a wall forming a refining barrier associated with an orifice via which a surface layer of the molten matter is one of removed and skimmed off.

9. The recycling apparatus according to claim 8, wherein the molten matter is cooled firstly on a drum cooled internally by water, and then in a quenching bath.

10. The recycling apparatus according to claim 1, wherein the melting and vitrification furnace is provided with a quenching bath in which combustion gases produced by the furnace are cooled.

* * * * *